(12) United States Patent
Xiao et al.

(10) Patent No.: US 7,985,814 B2
(45) Date of Patent: Jul. 26, 2011

(54) MAIN CATALYST COMPONENT FOR OLEFIN POLYMERIZATION, A PROCESS FOR PREPARING THE SAME AND A CATALYST COMPRISING THE SAME

(75) Inventors: Mingwei Xiao, Shanghai (CN); Shijiong Yu, Shanghai (CN); Xiaofeng Ye, Shanghai (CN)

(73) Assignees: China Petroleum & Chemical Corporation, Beijing (CN); Shanghai Research Institute of Chemical Industry, Shanghai (CN)

( * ) Notice: Subject to any disclaimer, the term of this patent is extended or adjusted under 35 U.S.C. 154(b) by 837 days.

(21) Appl. No.: 11/714,255

(22) Filed: Mar. 6, 2007

(65) Prior Publication Data

US 2007/0213482 A1    Sep. 13, 2007

(30) Foreign Application Priority Data

Mar. 7, 2006 (CN) .......................... 2006 1 0024433

(51) Int. Cl.
*C08F 4/44* (2006.01)
(52) U.S. Cl. .................................... 526/124.3; 502/110
(58) Field of Classification Search .................. 502/110; 526/124.3

See application file for complete search history.

(56) References Cited

U.S. PATENT DOCUMENTS 5,298,474 A * 3/1994 Luciani et al. ................ 502/115
6,365,540 B1 * 4/2002 Garoff et al. .................. 502/169
2005/0170949 A1 * 8/2005 Xiao et al. ..................... 502/115

* cited by examiner

*Primary Examiner* — Ling-Siu Choi
*Assistant Examiner* — Sonya Wright
(74) *Attorney, Agent, or Firm* — Birch, Stewart, Kolasch & Birch, LLP

(57) ABSTRACT

The present invention provides a main catalyst component for olefin polymerization, which is prepared by a process comprising the steps of: (i) reacting a magnesium compound in nascent state having a rational formula $(RMgX)_y(MgX_2)$, in which R is an alkyl having from 3 to 12 carbon atoms, X is a halogen, and y is a value of from 0.02 to 1, with an alcohol having a formula $R^1OH$, in which $R^1$ is an alkyl having from 2 to 12 carbon atoms, to form a homogeneous solution; (ii) reacting an alkyl magnesium compound having a formula R'MgR", in which R' and R" are independently an alkyl having from 1 to 20 carbon atoms, with the homogeneous solution formed in the step (i) to form a magnesium complex; (iii) reacting the magnesium complex with a halogenating agent in the presence of a silica, to form a magnesium halide-containing intermediate product; and (iv) reacting the magnesium halide-containing intermediate product from the step (iii) with a titanium compound having a formula $Ti(OR^2)_mCl_{4-m}$, in which $R^2$ is an alkyl having from 1 to 10 carbon atoms and m is an integer of from 0 to 4, to form a titanium-containing main catalyst component. The main catalyst component of the invention, when used together with an orgaoaluminium cocatalyst component in a single polymerization stage in one reactor to catalyze the polymerization of ethylene to polyethylene, gives a polyethylene having a molecular weight distribution of from 6 to 10.

16 Claims, 2 Drawing Sheets

MAIN CATALYST COMPONENT FOR OLEFIN POLYMERIZATION, A PROCESS FOR PREPARING THE SAME AND A CATALYST COMPRISING THE SAME

CROSS REFERENCE OF RELATED APPLICATION

The present application claims priority Chinese Patent Application No. 200610024433.6, filed on Mar. 7, 2006, which is incorporated herein by reference in its entirety and for all purposes.

TECHNICAL FIELD

The present invention relates to a main catalyst component for olefin polymerization, a process for preparing the same and an olefin polymerization catalyst comprising the same. The olefin polymerization catalyst is useful in homopolymerization and copolymerization of ethylene.

BACKGROUND OF THE INVENTION

Conventional Ziegler-Natta catalysts consist of a main catalyst component (also known as pro-catalyst) and a cocatalyst component. The main catalyst component comprises typically a compound of a transition metal from Group IVB of the Periodic Table, in particular a titanium compound. The cocatalyst component is typically an organoaluminium compound, for example, $Al(C_2H_5)_3$, $Al(C_2H_5)_2Cl$, $Al_2(C_2H_5)_3Cl_3$, and the like. Since coming out in 1950's, Ziegler-Natta type catalysts have developed over several generations and have properties greatly improved. For example, the development of supported catalysts has markedly enhanced the polymerization activities of Ziegler-Natta catalysts.

Active magnesium dichloride is a most effective carrier of Ziegler-Natta catalysts. There exist a number of known techniques that utilize active magnesium dichloride carrier or active magnesium dichloride-inorganic oxide complex carrier to prepare Ziegler-Natta catalysts. Many magnesium compounds, such as commercial available anhydrous magnesium dichloride, dialkyl magnesium compounds, dialkoxy magnesium compounds, Grignard reagent, magnesium compounds in nascent state (see, for example, CN1041312C), and the like, have been used as sources of active magnesium dichloride in the prior art. These different methods give generally catalysts different from each other in chemical composition, distribution of active sites, polymerization behavior, and property of the obtained polymers.

Most of known techniques utilize a single magnesium compound as a source of active magnesium dichloride in the preparation of a Ziegler-Natta catalyst. There are also techniques that utilize two or more magnesium compounds as sources of active magnesium dichloride in the preparation of a Ziegler-Natta catalyst.

For example, CN 1051318C utilizes both a magnesium halide and an alkoxy magnesium to prepare a pro-catalyst in a process comprising contacting a particulate inorganic support with a chlorinating agent, and then impregnating the particulate inorganic support with an impregnating solution comprising i) a magnesium dihalide, ii) an alkoxy magnesium, iii) an alkoxy titanium compound, and iv) an electron donor.

CN 1299375A discloses a catalyst component for olefin polymerization prepared by contacting a $MgCl_2$ or $ROMgCl$-coated carrier with an alkyl metal halide, then with a magnesium-containing composition $R^2_{n2}(R^3O)_{2-n2}Mg$, and then with a titanium halide.

CN 1072683C discloses a process for preparing a catalyst, comprising (i) activating a silica support by contacting it with a solution of a dialkyl magnesium or an alkyl magnesium chloride in a liquid aliphatic hydrocarbon solvent, (ii) impregnating the activated silica support with a solution of $TiCl_4$ and a tetraalkoxy titanium as well as $MgCl_2$ in a liquid aliphatic or aromatic ester, and (iii) treating the solid from step (ii) with an alkyl aluminium sesquichloride.

U.S. Pat. No. 6,365,540 B1 discloses a compound containing magnesium, halide, and alkoxy and having a formula $Mg_pX_q(OR)_{2p-q}$, preferably $MgCl_2[Mg(OR)_2]_2$. This compound is formed by reacting $MgCl_2$ with an alcohol ROH in benzene, and then with an alkyl magnesium $R'_2Mg$. Impregnating a reaction product of this compound with $TiCl_4$ on a carrier will give a catalyst.

These patents and patent application use two kinds of magnesium compounds during the catalyst preparation, and convert said magnesium compounds into active magnesium dichloride by different methods. Their purposes are to find a catalyst exhibiting a good balance in activity and hydrogen response, or to improve gelation property of polymers, or to enhance activities of catalysts. There is not prior art that teaches or suggests the use of two or more magnesium compounds in the preparation of a main catalyst component for olefin polymerization in order to broaden a molecular weight distribution of the polymer obtained by using said main catalyst component.

It is known in the art that a polyethylene having broader molecular weight distribution will have better processibility, and many researches focus on the preparation of polyethylenes having broad or bimodel molecular weight distribution through a multi-stage polymerization process or by using a complexed catalyst system.

Therefore, it is desired to develop a catalyst which is capable of producing a polyethylene having broader molecular weight distribution in a single polymerization stage in one reactor.

SUMMARY OF THE INVENTION

An object of the present invention is to provide a main catalyst component for olefin polymerization, which main catalyst component, when used in olefin polymerization, exhibits high polymerization activity and good hydrogen response, and gives a polymer having broader molecular weight distribution.

Another object of the present invention is to provide a process for preparing the main catalyst component.

Still another object of the present invention is to provide a catalyst for olefin polymerization consisting of the main catalyst component according to the present invention and a cocatalyst component.

Still another object of the present invention is to provide an ethylene polymerization process, comprising contacting ethylene and optional α-olefin comonomer(s) with the catalyst according to the present invention under polymerization conditions.

PREFERRED EMBODIMENTS FOR CARRYING OUT THE INVENTION

In the first aspect, the present invention provides a main catalyst component for olefin polymerization, which is prepared by a process comprising the steps of:

(i) reacting a magnesium compound in nascent state having a rational formula $(RMgX)_y(MgX_2)$, in which R is an alkyl having from 3 to 12 carbon atoms, X is a halogen, and y is a value of from 0.02 to 1, with an alcohol having a formula $R^1OH$, in which $R^1$ is an alkyl having from 2 to 12 carbon atoms, to form a homogeneous solution;

(ii) reacting an alkyl magnesium compound having a formula R'MgR", in which R' and R" are independently an alkyl having from 1 to 20 carbon atoms, with the homogeneous solution formed in the step (i) to form a magnesium complex;

(iii) reacting the magnesium complex with a halogenating agent in the presence of a silica, to form a magnesium halide-containing intermediate product; and (iv) reacting the magnesium halide-containing intermediate product from the step (iii) with a titanium compound having a formula $Ti(OR^2)_mCl_{4-m}$, in which $R^2$ is an alkyl having from 1 to 10 carbon atoms and m is an integer of from 0 to 4, to form a titanium-containing main catalyst component.

The magnesium compound in nascent state is prepared by reacting powdered magnesium with an alkyl halide of formula RX, and has a rational formula of $(RMgX)_y(MgX_2)$, in which y is a value of from 0.02 to 1.0, preferably from 0.1 to 1.0, R is an alkyl having from 3 to 12 carbon atoms, and X is a halogen, preferably chlorine. The reaction of the powdered magnesium and the alkyl halide can be carried out in an alkane solvent, and the molar ratio of Mg to the alkyl halide may be in a range of from 1:1 to 1:3, preferably from 1:1 to 1:2. More detailed information about the preparation of the magnesium compound in nascent state can be found in Chinese Patent CN1041312C, which is incorporated herein by reference.

The alcohol compound used in the preparation of the main catalyst component has a formula $R^1OH$, in which $R^1$ is an alkyl having from 2 to 12 carbon atoms. Examples of suitable alcohols include, but are not limited to, ethanol, propanol, isobutanol, 2-ethylhexanol, 2-methylpentanol, 2-ethylbutanol, octanol, and mixtures thereof.

The alkyl magnesium compound used in the preparation of the main catalyst component has a formula R'MgR", in which R' and R" are independently an alkyl having from 1 to 20 carbon atoms, preferably from 2 to 12 carbon atoms. Examples of suitable alkyl magnesium compounds include, but are not limited to, diethyl magnesium, dibutyl magnesium, butyl ethyl magnesium, butyl octyl magnesium, and the like, and mixtures thereof. Alternatively, a complex of the alkyl magnesium compound and an aluminium compound can be used. The preparation of such a complex is known in the art (see, Malpass, D. B. and Franin, L. W., J. Organometal Chem., 1975, 93, 1).

Examples of the halogenating agent used in the preparation of the main catalyst component include alkyl aluminium halides, $SiX_4$, $BX_3$, and $CX_4$, wherein X is a halogen, preferably chlorine. Alkyl aluminium halides are preferred, and alkyl aluminium chlorides having a formula $R^3{}_nAlCl_{3-n}$, in which $R^3$ is an alkyl having from 1 to 14 carbon atoms and n is in a range of from 1 to 2, are more preferred. Specific examples of the halogenating agent include, but are not limited to, diethyl aluminium chloride, ethyl aluminium dichloride, diisopropyl aluminium chloride, dibutyl aluminium chloride, silicon tetrachloride, boron trichloride, and carbon tetrachloride.

The silica used in the preparation of the main catalyst component has an average particle size ranging from 5 to 250 microns, preferably from 10 to 90 microns, and a specific surface area of at least 3 m²/g, preferably from 30 to 500 m²/g.

The silica can be selected from commercial products, such as Crosfield ES70X, Grace Davison 955, 948, etc.

In the present invention, the silica is used as a carrier, and may be heat-treated at high temperature in a manner known in the art to reduce the content of hydroxy group on its surface prior to use. For example, the silica can be heat-treated at a temperature of from 200 to 1000° C., preferably from 300 to 800° C. Preferably, the silica is treated under nitrogen gas flow in a fluidized bed at 600-700° C. for 10 hours, and then is discharged for standby.

The titanium compound used in the preparation of the main catalyst component has a formula $Ti(OR^2)_mCl_{4-m}$, wherein $R^2$ is an alkyl having from 1 to 10 carbon atoms, preferably from 1 to 4 carbon atoms, and m is in a range of from 0 to 4. Examples of suitable titanium compounds include, but are not limited to, titanium tetrachloride, tetra-n-butyl titanate, methoxy titanium trichloride, butoxy titanium trichloride, and mixtures thereof, with titanium tetrachloride being preferable.

When used together with an orgaoaluminium cocatalyst component in olefin polymerization, the main catalyst component according to the invention exhibits high polymerization activity and good hydrogen response, and gives a polymer having relatively broad molecular weight distribution. In particular, when used together with an orgaoaluminium cocatalyst component in a single polymerization stage in one reactor to catalyze the polymerization of ethylene to polyethylene, the main catalyst component gives a polyethylene having a molecular weight distribution (mw/Mn) of from 6 to 10, or from 6.5 to 9, or from 7 to 8.

In the second aspect, the present invention provides a process for the preparation of the main catalyst component according to the invention. As described above, the main catalyst component can be prepared through a process comprising the steps of:

(i) reacting a magnesium compound in nascent state having a rational formula $(RMgX)_y(MgX_2)$, in which R is an alkyl having from 3 to 12 carbon atoms, X is a halogen, and y is a value of from 0.02 to 1, with an alcohol having a formula $R^1OH$, in which $R^1$ is an alkyl having from 2 to 12 carbon atoms, to form a homogeneous solution;

(ii) reacting an alkyl magnesium compound having a formula R'MgR", in which R' and R" are independently an alkyl having from 1 to 20 carbon atoms, with the homogeneous solution formed in the step (i) to form a magnesium complex;

(iii) reacting the magnesium complex with a halogenating agent in the presence of a silica, to form a magnesium halide-containing intermediate product; and (iv) reacting the magnesium halide-containing intermediate product from the step (iii) with a titanium compound having a formula $Ti(OR^2)_mCl_{4-m}$, in which $R^2$ is an alkyl having from 1 to 10 carbon atoms and m is an integer of from 0 to 4, to form a titanium-containing main catalyst component.

In an embodiment of the invention, the steps (i)-(iv) of said process are carried out in an inert diluent/solvent. Examples of the inert diluent/solvent include, but are not limited to, aliphatic hydrocarbons, alicyclic hydrocarbons, and aromatic hydrocarbons, such as pentane, hexane, heptane, octane, nonane, decane, benzene, toluene, and mixtures thereof. Aliphatic hydrocarbons having 5 to 10 carbon atoms are preferred.

In the step (i), the alcohol $R^1OH$ and the magnesium compound in nascent state are used in such amounts that a molar ratio of the alcohol to Mg in the magnesium compound in nascent state ($R^1OH/Mg$) is in a range of from 1.5:1 to 7.0:1, preferably from 2.0:1 to 6.0:1.

The reaction between the magnesium compound in nascent state and the alcohol is generally conducted in an inert diluent/solvent mentioned above. In general, the alcohol compound R¹OH is added, as one batch or portion-wise or dropwise, to the magnesium compound in nascent state in the inert diluent at ambient temperature. If the alcohol compound is added portion-wise or dropwise, the period of time for adding said alcohol compound may be about 10 minutes and even up to about 3 hours. Upon the completion of the addition of the alcohol compound, the temperature of the reaction mixture can be elevated to 50-150° C., preferably 60-100° C., and the reaction is continued for 2 to 10 hours, preferably 2 to 8 hours.

In the step (ii), the alkyl magnesium compound is used in such an amount that a molar ratio of the alcohol R¹OH used in the step (i) to the alkyl magnesium compound (R¹OH/R'MgR") is in a range of from 1.5:1 to 2.5:1, preferably from 1.6:1 to 2.4:1.

In general, the alkyl magnesium compound is added to the homogeneous solution prepared in the step (i), and the reaction between them gives a magnesium complex in the form of homogeneous solution. The alkyl magnesium compound may be added as one batch or portion-wise or, preferably, dropwise at a temperature of from 10 to 60° C., preferably from 20 to 50° C. If the alkyl magnesium compound is added portion-wise or dropwise, the period of time for adding said alkyl magnesium compound may be about 10 minutes and even up to about 1 hour. Upon the completion of the addition of the alkyl magnesium compound, the reaction is allowed to continue for 2 to 5 hours, preferably 3 to 4 hours.

In the step (iii), the halogenating agent is used in such an amount that a molar ratio of the halogenating agent to Mg in the magnesium complex is in a range of from 0.1:1 to 1.0:1, preferably from 0.2:1 to 0.9:1, and the silica is used in an amount of from 0.2 to 1 gram, preferably from 0.25 to 0.67 grams, relative to one millimole of Mg in the magnesium complex.

The sequence for contacting the halogenating agent, the silica, and the magnesium complex is not crucial. It is possible to contact the halogenating agent and the silica, followed by contacting the resultant product with the magnesium complex. Alternatively, it is also possible to contact the magnesium complex from step (ii) with the silica, followed by contacting the resultant product with the halogenating agent.

In a preferred embodiment of the invention, the heat-treated silica is slurried in an alkane solvent, then the resultant slurry reacts with the halogenating agent, and then with the magnesium complex solution. The reaction between the silica and the halogenating agent is generally conducted at ambient temperature for from 0.5 to 4 hours, preferably from 1 to 2 hours. In general, the magnesium complex solution is added to the reaction product of the silica and the halogenating agent at ambient temperature, then the temperature of the reaction mixture can be elevated to 50 to 100° C., and the reaction is continued at that temperature for 2 to 10 hours, preferably 3 to 5 hours.

In another embodiment of the invention, the heat-treated silica reacts with the magnesium complex solution, and the resultant product reacts then with the halogenating agent. The reaction between the silica and the magnesium complex solution is generally carried out at ambient temperature for from 0.5 to 4 hours, preferably for 1 to 2 hours. After adding the halogenating agent into the reaction mixture, the mixture is heated to a temperature of from 50 to 100° C., and the reaction is continued at that temperature for 2 to 10 hours, preferably 3 to 5 hours.

In the step (iv), the titanium compound is used in such an amount that a molar ratio of Ti in the titanium compound to Mg in the magnesium complex is in a range of from 0.2:1 to 2.0:1, preferably from 0.25:1 to 1.5:1.

In general, the titanium compound is added to the magnesium halide-containing intermediate product as a suspension from the step (iii) at ambient temperature. The titanium compound may be added as one batch or portion-wise or dropwise. If the titanium compound is added portion-wise or dropwise, the period of time for adding said titanium compound may be about 10 minutes and even up to about 2 hours. Upon the completion of the addition of the titanium compound, the reaction mixture is heated to a temperature of from 50 to 100° C., and the reaction is continued at that temperature for 1 to 10 hours, preferably 3 to 8 hours. Upon the completion of the reaction, the reaction mixture is filtered, and the solid product can be washed and dried according to methods known in the art, to give the main catalyst component according to the invention.

In the third aspect, the present invention provides a high-activity catalyst for olefin polymerization formed by contacting the main catalyst component according to the present invention and a cocatalyat component, wherein a molar ratio of Ti in the main catalyst component to Al in the cocatalyst component is in a range of from 1:30 to 1:300, preferably from 1:50 to 1:250.

The cocatalyst component useful in the catalyst according to the present invention is well known in the art. Examples of the cocatalyst component include organoaluminum compounds, such as triethyl aluminum, diethyl aluminum chloride, tri-isobutyl aluminum, tri-n-hexyl aluminum and mixtures thereof, with triethyl aluminum being preferred.

The catalyst of the present invention can be used in the homopolymerization of ethylene, or in the copolymerization of ethylene and one or more aliphatic α-olefins having 3-20, preferably 3-8 carbon atoms. Examples of suitable α-olefins include propylene, 1-butene, 1-pentene, 1-hexene, 4-methyl-1-pentene, 1-heptene, and 1-octene. The preferable α-olefin is 1-butene and 1-hexene.

Accordingly, in the fourth aspect, the present invention provides an ethylene polymerization process, comprising contacting ethylene and the optional α-olefin comonomer(s) with the catalyst according to the present invention under polymerization conditions.

The high-activity catalyst for olefin polymerization according to the present invention can be used in a slurry process or a gas phase process of ethylene polymerization, with the gas phase processes of ethylene polymerization being preferred.

When a gas phase process of ethylene polymerization is employed, the polymerization temperature can be in a range of from 70 to 115° C., preferably from 85 to 110° C., and polymerization pressure can be in a range of from 0.5 to 5.0 MPa, preferably from 1.0 to 3.0 MPa.

When a slurry process of ethylene polymerization is employed, the polymerization temperature can be in a range of from 60 to 100° C., preferably from 70 to 95° C., and polymerization pressure can be in a range of from 0.5 to 2.0 MPa.

In the polymerization of ethylene catalyzed by the catalyst of the present invention, hydrogen gas can be used as a chain transfer agent to adjust the melt index of a polymer, and a polyethylene product with a melt index ($MI_{2.16}$) of from 0 to 1000 or more grams per 10 minutes can be obtained.

Using the catalyst according to the invention, it is possible to prepare a polyethylene having a relatively broad molecular weight distribution (Mw/Mn) of, for example, from 6 to 10, preferably from 6.5 to 9, more preferably from 7 to 8, in a single polymerization stage in one polymerization reactor.

Without limited to a specific theory, it is believed that using both the magnesium compound in nascent state and the alkyl magnesium compound as active magnesium halide sources in the preparation of the main catalyst component imparts the ability of producing a polymer having a relatively broad molecular weight distribution to the catalyst according to the invention.

In one embodiment of this aspect, the invention is to provide a process for polymerizing ethylene, comprising the steps of:

(i) providing a catalyst according to the invention;
(ii) contacting ethylene and optional α-olefin comonomer(s) having from 3 to 20 carbon atoms with the catalyst under polymerization conditions, to form a polyethylene product; and
(iii) recovering the polyethylene product.

Compared with the prior art, the olefin polymerization catalyst of the present invention has the following advantages:

1) Because both the magnesium compound in nascent state and the alkyl magnesium compound are used as magnesium sources, the catalyst of the present invention can give a polymer having relatively broad molecular weight distribution (Mw/Mn) of from 6 to 10, while a catalyst, which is prepared in a similar method but without using the alkyl magnesium compound as magnesium source, gives generally a molecular weight distribution (Mw/Mn) of from 4 to 5.

2) The catalyst of the present invention exhibits a high polymerization activity and good hydrogen response.

3) The catalyst of the present invention has good particle morphology, and the polymer product also has good particle morphology and contains less fine powder.

Figure 1:
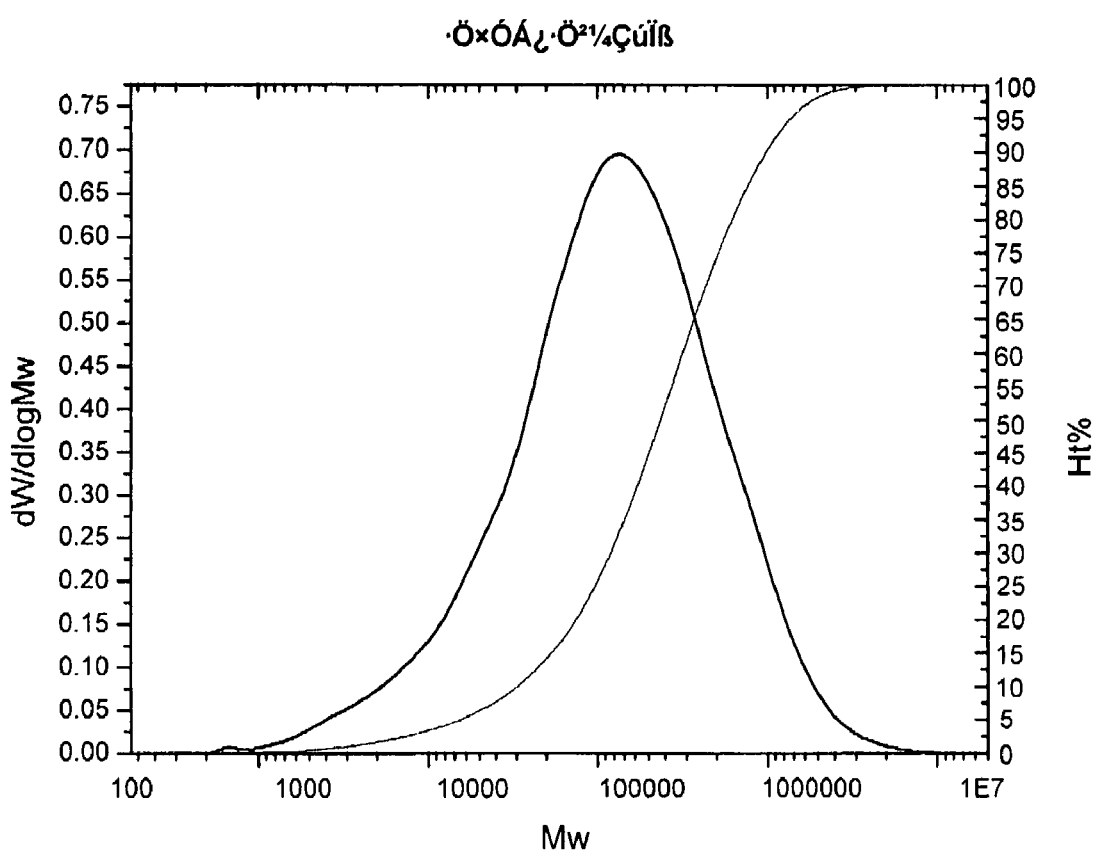
FIG. 1 is the molecular weight distribution curve of the polymer obtained in Polymerization Evaluation 2 of Example 1.

In the figures, Mw represents molecular weight, dW/dlogMw represents a fraction by weight of molecules having a molecular weight Mw, and Ht % represents cumulative fraction by weight.

EXAMPLES

The following examples are provided to illustrate the present invention more detailedly, but the examples don't intend to limit the scope of the invention in any way.

In the examples, the measurements of properties and indices of polymer products are performed as follows:

Melt index (MI): measured according to ASTM D1238, condition E, at 190° C.

Bulk density of polymer: measured according to ASTM D1895.

Particle size distribution of polymer: measured by sieving using standard sieves.

Molecular weight and molecular weight distribution of polymer: measured by GPC on PL-GPC 220 instrument with conditions: temperature: 150° C.; solvent: trichlorobenzene; sample concentration: 0.1 mg/ml; injection amount of the sample: 200 μl.

In the following examples, "$OH/Mg_1$" indicates the molar ratio of the alcohol to Mg in the magnesium compound in nascent state, "$OH/Mg_2$" indicates the molar ratio of the alcohol to Mg in the alkyl magnesium compound, "Al/Mg" or "Si/Mg" indicates the molar ratio of the halogenating agent to Mg in the magnesium complex, "Ti/Mg" indicates the molar ratio of Ti in the titanium compound to Mg in the magnesium complex, and "$mmolMg/gSiO_2$" indicates the millimoles of Mg in the magnesium complex, relative to one gram of silica used.

As used herein, "ambient temperature" refers to a temperature of about 20 to 25° C.

The silica used in the following examples had been heat-treated under nitrogen gas flow in a fluidized bed at 600° C. for 10 hours.

Preparation Example 1

Preparation of a Magnesium Compound in Nascent State

A magnesium compound in nascent state was prepared through a method described in CN 1041312C.

Into a 250 ml 5-necked glass flask provided with a stirrer, a condenser, a dropping funnel and means for heating were charged with 100 ml of hexane and 1.5 g of powdered magnesium. 13 ml of n-butyl chloride was dropwise added to the flask at ambient temperature. Then the mixture was allowed to react at 60° C. for 3 hours, and a black suspension of magnesium chloride solid in nascent state was obtained. After hexane washing and drying under nitrogen flow, a solid of magnesium chloride in nascent state was obtained, and it was found to have a rational formula I $(BuMgCl)_{0.3}(MgCl_2)$.

Preparation Example 2

Preparation of Magnesium Complex A

At ambient temperature, to a reactor were added the solid of magnesium chloride in nascent state prepared in the Preparation Example 1, 100 ml of toluene, and 20 ml of 2-ethylhexanol ($OH/Mg_1$=2.0 mol/mol) while stirring. The reaction mixture was heated to 85° C. and allowed to react at that temperature for 2 hours, to form a homogeneous solution. Then the reaction mixture was cooled to ambient temperature, and thereto was added dropwise 12 ml of dibutyl magnesium ($OH/Mg_2$=2.0 mol/mol) with the temperature of the reaction mixture being controlled at about 50° C. Upon the completion of the addition, the reaction was heated to 85° C. for 3 hours, to give a magnesium complex A as a homogeneous solution. The magnesium complex A has a Mg content of 0.933 mmol/ml.

Preparation Example 3

Preparation of Magnesium Complex B

A magnesium complex B was prepared according to the procedure as described in the Preparation Example 2, except for that heptane was used to replace toluene, the amount of 2-ethylhexanol was changed to 33 ml ($OH/Mg_1$=3.4 mol/mol), and the amount of dibutyl magnesium was changed to 22 ml (OH/Mg$_2$=1.8 mol/mol). The magnesium complex B has a Mg content of 0.990 mmol/ml.

Preparation Example 4

Preparation of Magnesium Complex C

A magnesium complex C was prepared according to the procedure as described in the Preparation Example 2, except for that 9 ml of ethanol (OH/Mg$_1$=2.5 mol/mol) was used to replace the 20 ml of 2-ethylhexanol, and the amount of dibutyl magnesium was changed to 13 ml (OH/Mg$_2$=2.3 mol/mol). The magnesium complex C has a Mg content of 0.972 mmol/ml.

Example 1

Preparation of Titanium-Containing Main Catalyst Component A

At ambient temperature, to 8 g of the heat-treated silica (Grace Davison 955) were added 80 ml of heptane and 0.8 ml of ethyl aluminum dichloride (Al/Mg=0.5 mol/mol), and the mixture was allowed to react for 1 hour with stirring. Then to the reaction mixture was added 17 ml of the magnesium complex A prepared above (2 mmolMg/gSiO$_2$), and the mixture was heated to 70° C. and maintained at that temperature for 3 hours. After cooling the reaction mixture to the ambient temperature, to the mixture was added 2 ml of titanium tetrachloride (Ti/Mg=1.1 mol/mol), and then the resultant mixture was heated to 85° C. and maintained at that temperature for 3 hours. After removing the supernatant, the residue was washed with heptane and dried under nitrogen flow, to form a titanium-containing main catalyst component A as a powdery solid.

Polymerization Evaluation 1

A slurry polymerization was carried out in a 2 L reactor. Hexane solvent (1000 ml), the solid main catalyst component A (about 70 mg), and triethyl aluminum (of which amount was such that a molar ratio of Al/Ti was 200) as cocatalyst were separately added into the reactor. After the temperature was elevated to 70° C., hydrogen gas was introduced into the reactor until the partial pressure of hydrogen reached 0.4 MPa, and then ethylene was continuously introduced into the reactor to maintain the total pressure inside the reactor at 1.0 MPa. The temperature was further elevated to 85° C. and the polymerization reaction was performed at that temperature for 2 hours. Then feed of ethylene was stopped, the reactor was cooled rapidly and the gases therein were vented. The polymer slurry was recovered, and polyethylene powder was separated from hexane. The results of the polymerization evaluation 1 are shown in Table 1, and sieving results of the polymer are shown in Table 2.

Polymerization Evaluation 2

A slurry polymerization was carried out according to the procedure described in the above Polymerization Evaluation 1, except for that the partial pressure of hydrogen was changed to 0.1 MPa, and polymerization time was changed to 1 hour. The results of the polymerization as well as polymer characterization are shown in Table 3. The molecular weight distribution curve of the resultant polyethylene obtained by GPC is shown in FIG. 1.

Example 2

Preparation of Titanium-Containing Main Catalyst Component B

At ambient temperature, to 10 g of the heat-treated silica (Grace Davison 955) were added 80 ml of heptane and 1.6 ml of ethyl aluminum dichloride (Al/Mg=0.7 mol/mol), and the mixture was allowed to react for 1 hour with stirring. Then to the reaction mixture was added 22 ml of the magnesium complex B prepared above (2.2 mmolMg/gSiO$_2$), and the mixture was heated to 70° C. and maintained at that temperature for 3 hours. After cooling the reaction mixture to the ambient temperature, to the mixture was added 1.2 ml of titanium tetrachloride (Ti/Mg=0.5 mol/mol), and then the resultant mixture was heated to 85° C. and maintained at that temperature for 3 hours. After removing the supernatant, the residue was washed with heptane and dried under nitrogen flow, to form a titanium-containing main catalyst component B as a powdery solid.

Polymerization Evaluation

A slurry polymerization was carried out according to the procedure as described in Example 1, Polymerization Evaluation 1 using the main catalyst component B. The results of the polymerization evaluation are shown in Table 1, and sieving results of the polymer are shown in Table 2.

Example 3

Preparation of Titanium-Containing Main Catalyst Component C

At ambient temperature, to 10 g of the heat-treated silica (Grace Davison 955) were added 80 ml of heptane and 2.0 ml of ethyl aluminum dichloride (Al/Mg=0.6 mol/mol), and the mixture was allowed to react for 1 hour with stirring. Then to the reaction mixture was added 33 ml of the magnesium complex C prepared above (3.2 mmolMg/gSiO$_2$), and the mixture was heated to 70° C. and maintained at that temperature for 3 hours. After cooling the reaction mixture to the ambient temperature, to the mixture was added 5.0 ml of titanium tetrachloride (Ti/Mg=1.4 mol/mol), and then the resultant mixture was heated to 85° C. and maintained at that temperature for 3 hours. After removing the supernatant, the residue was washed with heptane and dried under nitrogen flow, to form a titanium-containing main catalyst component C as a powdery solid.

Polymerization Evaluation

A slurry polymerization was carried out according to the procedure as described in Example 1, Polymerization Evaluation 1 using the main catalyst component C. The results of the polymerization evaluation are shown in Table 1, and sieving results of the polymer are shown in Table 2.

Example 4

Preparation of Titanium-Containing Main Catalyst Component D

At ambient temperature, to 15 g of the heat-treated silica (Grace Davison 955) were added 100 ml of heptane and 1.0 ml of diethyl aluminum chloride (Al/Mg=0.5 mol/mol), and the mixture was allowed to react for 1 hour with stirring. Then to the reaction mixture was added 18 ml of the magnesium complex A prepared above (1.1 mmolMg/gSiO$_2$), and the mixture was heated to 70° C. and maintained at that temperature for 3 hours. After cooling the reaction mixture to the ambient temperature, to the mixture was added 1.5 ml of titanium tetrachloride (Ti/Mg=0.8 mol/mol), and then the resultant mixture was heated to 85° C. and maintained at that temperature for 3 hours. After removing the supernatant, the residue was washed with heptane and dried under nitrogen flow, to form a titanium-containing main catalyst component D as a powdery solid.

Polymerization Evaluation

A slurry polymerization was carried out according to the procedure as described in Example 1, Polymerization Evaluation 1 using the main catalyst component D. The results of the polymerization evaluation are shown in Table 1, and sieving results of the polymer are shown in Table 2.

Example 5

Preparation of Titanium-Containing Main Catalyst Component E

At ambient temperature, to 10 g of the heat-treated silica (Grace Davison 955) were added 100 ml of heptane and 26 ml of the magnesium complex A prepared above (2.4 mmolMg/gSiO$_2$), and the mixture was allowed to react for 1 hour with stirring. Then to the reaction mixture was added 0.8 ml of silicon tetrachloride (Si/Mg=0.3 mol/mol), and the mixture was allowed to react with stirring at ambient temperature for 1 hour and then at 70° C. for 2 hours. After cooling the reaction mixture to ambient temperature, to the mixture was added 1.3 ml of titanium tetrachloride (Ti/Mg=0.5 mol/mol), and then the resultant mixture was heated to 85° C. and maintained at that temperature for 3 hours. After removing the supernatant, the residue was washed with heptane and dried under nitrogen flow, to form a titanium-containing main catalyst component E as a powdery solid.

Polymerization Evaluation

A slurry polymerization was carried out according to the procedure as described in Example 1, Polymerization Evaluation 1 using the main catalyst component E. The results of the polymerization evaluation are shown in Table 1, and sieving results of the polymer are shown in Table 2.

Example 6

Preparation of Titanium-Containing Main Catalyst Component F

At ambient temperature, to 10 g of the heat-treated silica (Grace Davison 955) were added 100 ml of heptane and 22 ml of the magnesium complex B prepared above (2.2 mmolMg/gSiO$_2$), and the mixture was allowed to react for 1 hour with stirring. Then to the reaction mixture was added 2.5 ml of diethyl aluminium chloride (Al/Mg=0.9 mol/mol), and the mixture was allowed to react with stirring at ambient temperature for 1 hour and then at 70° C. for 2 hours. After cooling the reaction mixture to ambient temperature, to the mixture was added 2.0 ml of titanium tetrachloride (Ti/Mg=0.8 mol/mol), and then the resultant mixture was heated to 85° C. and maintained at that temperature for 3 hours. After removing the supernatant, the residue was washed with heptane and dried under nitrogen flow, to form a titanium-containing main catalyst component F as a powdery solid.

Polymerization Evaluation

A slurry polymerization was carried out according to the procedure as described in Example 1, Polymerization Evaluation 1 using the main catalyst component F. The results of the polymerization evaluation are shown in Table 1, and sieving results of the polymer are shown in Table 2.

Comparative Example 1

A main catalyst component Z was prepared according to the procedure as described in Example 3 of CN 200310109018.7.

(1) Following the method disclosed in CN1041312C, a solution of magnesium compound in nascent state having a formula (MgBuCl)$_{0.28}$(MgCl$_2$) in tetrahydrofuran (THF) as electron donor (the solution contained total 14.2 mmol of Mg) was obtained by reacting a commercially available powdered magnesium with n-butyl chloride in a reactor flask. Then, 1.3 g of 2-ethylhexanol (10 mmol) was added in one batch to the solution at ambient temperature, and the reaction was then heated to 50° C., and allowed to continue at that temperature for 2 hours, to give a solution of magnesium-alcohol complex in THF.

(2) To 7.11 g of the heat-treated silica (Grace Davison 955) were added 40 ml of hexane and 1.2 g of diethyl aluminum chloride (10 mmol), and then the mixture was dried to give a silica carrier having alkyl aluminum compound supported thereon.

(3) The treated silica carrier (the product of step (2)) was added into the solution of the magnesium-alcohol complex in THF prepared in the step (1), and the mixture was allowed to react at 50° C. for 3 hours, and then was heated to 75° C. for drying. Drying was performed until the content of residual THF in the solid component reached 5.4 wt. %.

(4) The product of the step (3) was slurried in 50 ml of hexane, and 1.0 g (5.3 mmol) of titanium tetrachloride was then added at ambient temperature thereto. The mixture was allowed to react at 50° C. for 3 hours, and then was heated to 70° C. to evaporate hexane, to give a solid main catalyst component Z.

Polymerization Evaluation 1

A slurry polymerization was carried out according to the procedure as described in Example 1, Polymerization Evaluation 1 using the main catalyst component Z. The results of the polymerization evaluation 1 are shown in Table 1.

Polymerization Evaluation 2

Figure 2:
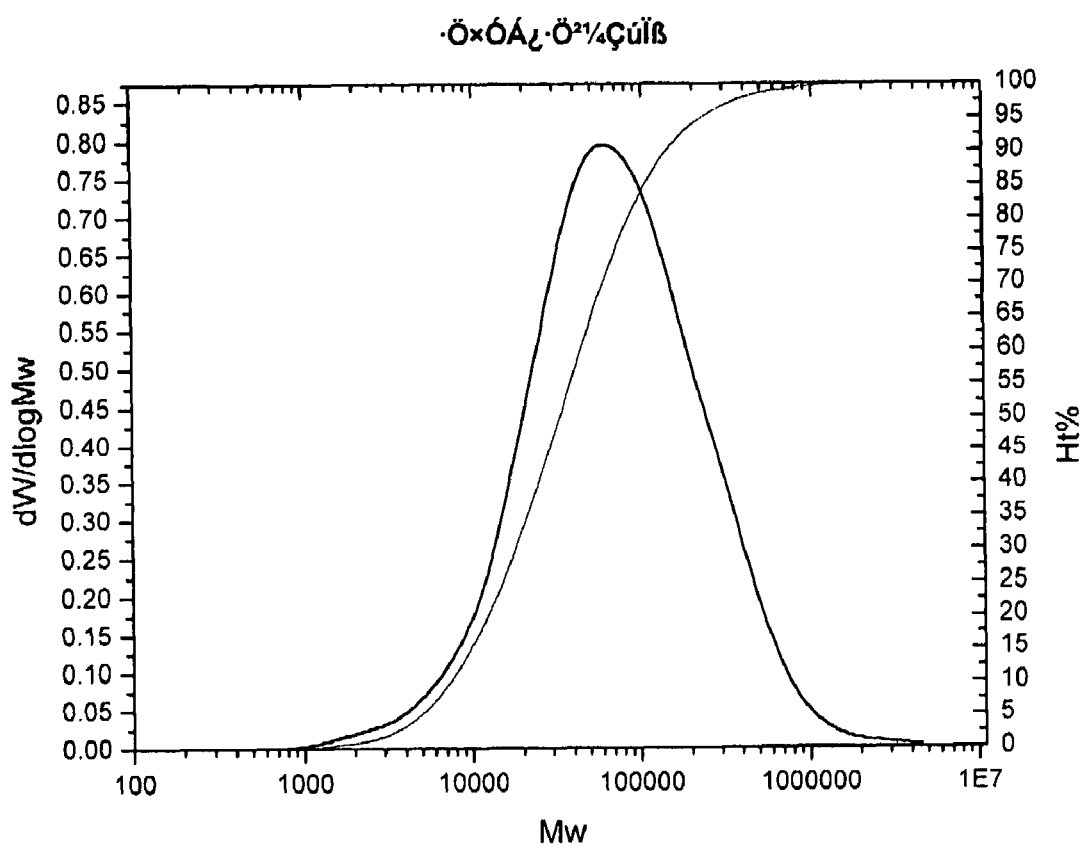
FIG. 2 is the molecular weight distribution curve of the polymer obtained in Polymerization Evaluation 2 of Comparative Example 1.

A slurry polymerization was carried out according to the procedure as described in Example 1, Polymerization Evaluation 2 using the main catalyst component Z. The results of the polymerization as well as polymer characterization are shown in Table 3. The molecular weight distribution curve of the resultant polyethylene obtained by GPC is shown in FIG. 2.

TABLE 1

|  | Activity* (gPE/gcat) | Melt Index (g/10 min) | Bulk Density (g/cm$^3$) |
|---|---|---|---|
| Example 1** | 4495 | 11.74 | 0.345 |
| Example 2 | 4659 | 13.26 | 0.344 |
| Example 3 | 4287 | 12.80 | 0.340 |
| Example 4 | 4690 | 12.76 | 0.347 |
| Example 5 | 4500 | 12.09 | 0.344 |
| Example 6 | 4338 | 12.84 | 0.323 |
| Comparative Example 1** | 4451 | 13.11 | 0.320 |

*Expressed as grams of polyethylene per gram of the main catalyst component.
**Polymerization evaluation 1

TABLE 2

Sieving Results of the Polyethylene Powder

|  | <20 mesh (wt %) | 20-40 mesh (wt %) | 40-60 mesh (wt %) | 60-75 mesh (wt %) | 75-120 mesh (wt %) | 120-200 mesh (wt %) | >200 mesh (wt %) |
|---|---|---|---|---|---|---|---|
| Example 1* | 0.5 | 35.0 | 32.9 | 24.6 | 5.7 | 1.1 | 0.2 |
| Example 2 | 0.4 | 30.1 | 36.1 | 18.2 | 5.5 | 9.6 | 0.1 |
| Example 3 | 0.5 | 33.5 | 37.4 | 17.2 | 7.8 | 3.5 | 0.1 |
| Example 4 | 0.7 | 34.9 | 30.5 | 16.4 | 8.2 | 9.1 | 0.2 |
| Example 5 | 0.4 | 45.2 | 28.9 | 19.4 | 3.0 | 2.8 | 0.3 |
| Example 6 | 0.4 | 39.5 | 33.0 | 20.2 | 4.4 | 2.3 | 0.2 |

*Polymerization evaluation 1

TABLE 3

|  | Activity* (gPE/gcat) | Melt Index (g/10 min) | Bulk Density (g/cm$^3$) | MWD (Mw/Mn) |
|---|---|---|---|---|
| Example 1** | 5239 | 0.32 | 0.377 | 7.78 |
| Comparative Example 1** | 5114 | 0.26 | 0.354 | 4.16 |

*Expressed as grams of polyethylene per gram of the main catalyst component.
**Polymerization evaluation 2

What is claimed is:

1. A main catalyst component for olefin polymerization, which is prepared by a process comprising the steps of:
    (i) reacting a magnesium compound in nascent state having a rational formula $(RMgX)_y(MgX_2)$, in which R is an alkyl having from 3 to 12 carbon atoms, X is a halogen, and y is a value of from 0.02 to 1, with an alcohol having a formula R'OH, in which $R^1$ is an alkyl having from 2 to 12 carbon atoms, to form a homogeneous solution;
    (ii) reacting an alkyl magnesium compound having a formula R'MgR", in which R' and R" are independently an alkyl having from 1 to 20 carbon atoms, with the homogeneous solution formed in the step (i) to form a magnesium complex;
    (iii) reacting the magnesium complex with a halogenating agent in the presence of a silica, to form a magnesium halide-containing intermediate product; and
    (iv) reacting the magnesium halide-containing intermediate product from the step (iii) with a titanium compound having a formula $Ti(OR^2)_mCl_{4-m}$, in which $R^2$ is an alkyl having from 1 to 10 carbon atoms and m is an integer of from 0 to 4, to form a titanium-containing main catalyst component.

2. The main catalyst component according to claim 1, which, when used together with an organoaluminium cocatalyst component in a single polymerization stage in one reactor to catalyze the polymerization of ethylene to polyethylene, gives a polyethylene having a molecular weight distribution of from 6 to 10.

3. The main catalyst component according to claim 1, wherein the alcohol is selected from the group consisting of ethanol, propanol, isobutanol, 2-ethylhexanol, 2-methylpentanol, 2-ethylbutanol, octanol, and mixtures thereof.

4. The main catalyst component according to claim 1, wherein the alkyl magnesium compound is selected from the group consisting of diethyl magnesium, dibutyl magnesium, butyl ethyl magnesium, butyl octyl magnesium, and mixtures thereof.

5. The main catalyst component according to claim 1, wherein the halogenating agent is selected from the group consisting of alkyl aluminium halides, $SiX_4$, $BX_3$, $CX_4$, in which X is a halogen, and mixtures thereof.

6. The main catalyst component according to claim 5, wherein the halogenating agent is an alkyl aluminium chloride having a formula $R^3{}_nAlCl_{3-n}$, in which $R^3$ is an alkyl having from 1 to 14 carbon atoms and n is in a range of from 1 to 2.

7. The main catalyst component according to claim 5, wherein the halogenating agent is selected from the group consisting of diethyl aluminium chloride, ethyl aluminium dichloride, diisopropyl aluminium chloride, dibutyl aluminium chloride, silicon tetrachloride, boron trichloride, carbon tetrachloride, and mixtures thereof.

8. A process for preparing the main catalyst component according to claim 1, comprising the steps of:
    (i) reacting a magnesium compound in nascent state having a rational formula $(RMgX)_y(MgX_2)$, in which R is an alkyl having from 3 to 12 carbon atoms, X is a halogen, and y is a value of from 0.02 to 1, with an alcohol having a formula $R^1OH$, in which $R^1$ is an alkyl having from 2 to 12 carbon atoms, to form a homogeneous solution;
    (ii) reacting an alkyl magnesium compound having a formula R'MgR", in which R' and R" are independently an alkyl having from 1 to 20 carbon atoms, with the homogeneous solution formed in the step (i) to form a magnesium complex;
    (iii) reacting the magnesium complex with a halogenating agent in the presence of a silica, to form a magnesium halide-containing intermediate product; and
    (iv) reacting the magnesium halide-containing intermediate product from the step (iii with a titanium compound having a formula $Ti(OR^2)_mCl_{4-m}$, in which $R^2$ is an alkyl having from 1 to 10 carbon atoms and m is an integer of from 0 to 4, to form a titanium-containing main catalyst component.

9. The process according to claim 8, wherein in the step (i), the alcohol $R^1OH$ and the magnesium compound in nascent state are used in such amounts that a molar ratio of the alcohol to Mg in the magnesium compound in nascent state is in a range of from 1.5:1 to 7.0:1, and/or
    wherein in the step (ii), the alkyl magnesium compound is used in such an amount that a molar ratio of the alcohol $R^1OH$ used in the step (i) to the alkyl magnesium compound is in a range of from 1.5:1 to 2.5:1, and/or
    wherein in the step (iii), the halogenating agent is used in such an amount that a molar ratio of the halogenating agent to Mg in the magnesium complex is in a range of from 0.1:1 to 1.0:1, and the silica is used in an amount of from 0.2 to 1 gram, relative to one millimole of Mg in the magnesium complex, and/or
    wherein in the step (iv), the titanium compound is used in such an amount that a molar ratio of Ti in the titanium compound to Mg in the magnesium complex is in a range of from 0.2:1 to 2.0:1.

10. The process according to claim 8, wherein the alcohol is selected from the group consisting of ethanol, propanol, isobutanol, 2-ethylhexanol, 2-methylpentanol, 2-ethylbutanol, octanol, and mixtures thereof.

11. The process according to claim 8, wherein the alkyl magnesium compound is selected from the group consisting of diethyl magnesium, dibutyl magnesium, butyl ethyl magnesium, butyl octyl magnesium, and mixtures thereof.

12. The process according to claim 8, wherein the halogenating agent is selected from the group consisting of alkyl aluminium halides, $SiX_4$, $BX_3$, $CX_4$, in which X is a halogen, and mixtures thereof.

13. The process according to claim 8, wherein the steps (i)-(iv) are carried out in an inert diluent/solvent selected from the group consisting of aliphatic hydrocarbons, alicyclic hydrocarbons, aromatic hydrocarbons, and mixtures thereof.

14. The process according to claim 8, wherein the steps (i)-(iv) are carried out in an inert diluent/solvent selected from the group consisting of pentane, hexane, heptane, octane, nonane, decane, benzene, toluene, and mixtures thereof.

15. A catalyst for olefin polymerization consisting of the main catalyst component according to claim 1 and a cocatalyst component selected from organoaluminum compounds, wherein a molar ratio of Ti in the main catalyst component to Al in the cocatalyst component is in a range of from 1:30 to 1:300.

16. A process for polymerizing ethylene, comprising the steps of:
(i) providing the catalyst according to claim 15;
(ii) contacting ethylene and optional α-olefin comonomer(s) having from 3 to 20 carbon atoms with the catalyst under polymerization conditions, to form a polyethylene product; and
(iii) recovering the polyethylene product.

\* \* \* \* \*